United States Patent [19]
Disko et al.

[11] 3,826,039
[45] July 30, 1974

[54] FIGURED TOY VEHICLE

[75] Inventors: Harry Disko, Chicago; Alan A. Hicks, Wilmette; Howard J. Morrison, Deerfield, all of Ill.

[73] Assignee: Marvin Glass & Associates, Chicago, Ill.

[22] Filed: May 23, 1973

[21] Appl. No.: 362,884

[52] U.S. Cl.......................... 46/98, 46/106, 46/209
[51] Int. Cl............................................... A63h 5/00
[58] Field of Search.......................... 46/97–99, 101, 46/103, 106, 202, 209, 221, 223

[56] References Cited
UNITED STATES PATENTS

| | | | |
|---|---|---|---|
| 2,757,482 | 8/1956 | Brown et al. | 46/106 |
| 2,940,755 | 6/1960 | Pouder | 46/98 |

*Primary Examiner*—Antonio F. Guida
*Assistant Examiner*—Robert F. Cutting
*Attorney, Agent, or Firm*—Coffee and Sweeney

[57] ABSTRACT

A toy wheeled vehicle combination having a chassis defining a human-form body. The body has a human-form head pivotally attached thereto, pivotal legs with feet portions, and pivoted arms with hand portions. A plurality of shell members defining different vehicle shapes are interchangeably, releasably mountable onto the human-form body through open bottoms in the shell members, with the head member protruding through a top shell opening. The arms and legs are engageable with blocking portions in the shells to releasably lock the chassis within any one of the shells. The wheeled chassis can be used alone as a roll toy by a child, giving the child amusement and a basis for fantasies involving a motorized human being. The wheel means comprises a solitary flywheel and the feet are weighted to stabilize the vehicle. The chassis normally is used in combination with one of the shells to give the appearance of a human being occupying a vehicle such as an automobile, airplane or boat.

13 Claims, 5 Drawing Figures

PATENTED JUL 30 1974　　3,826,039

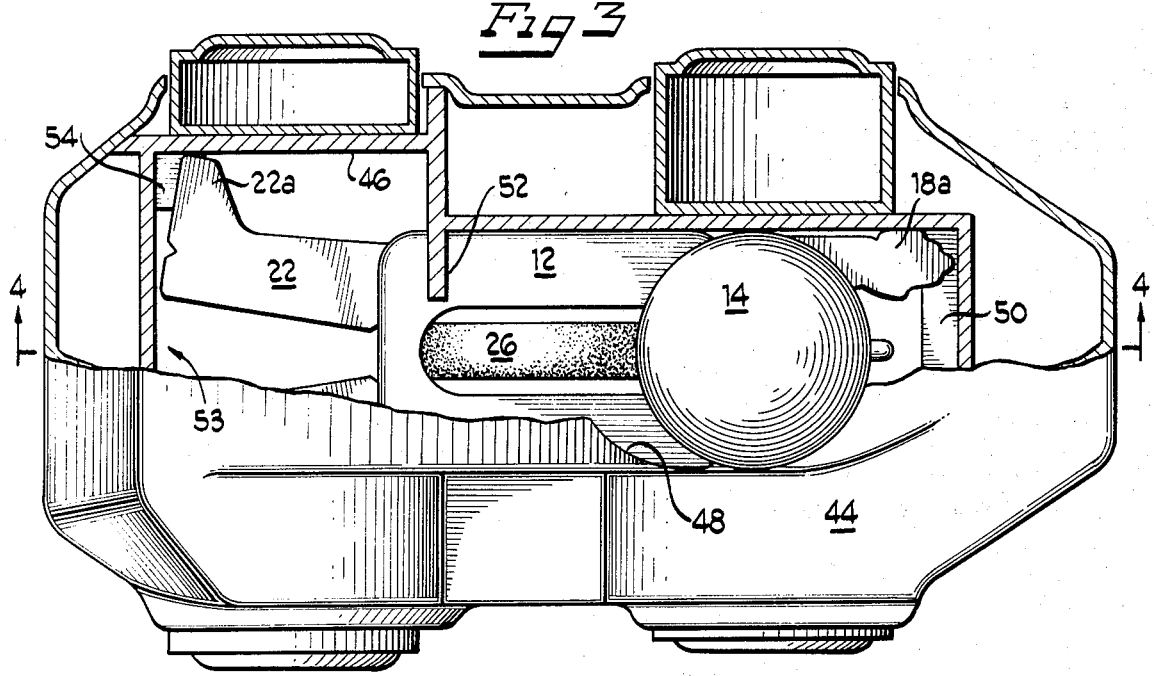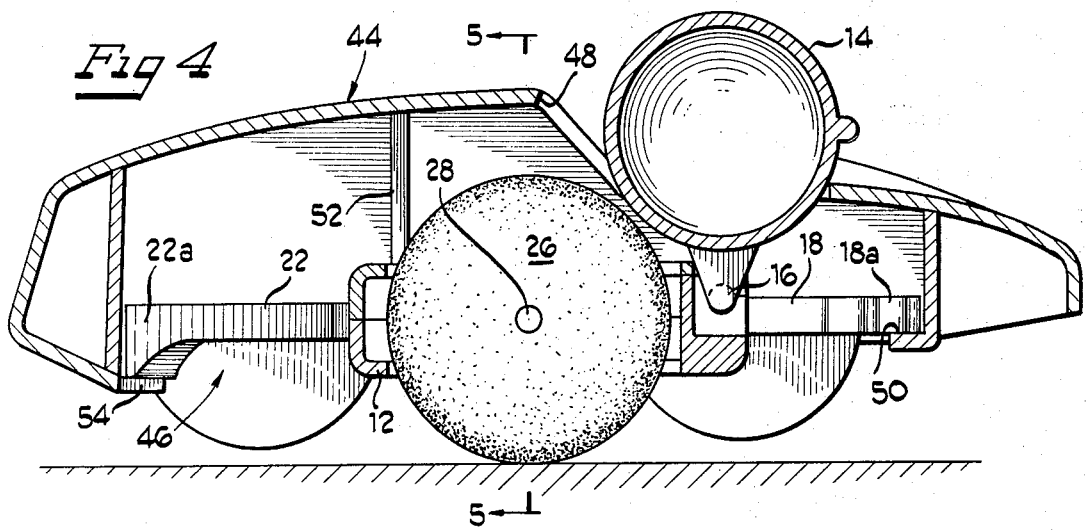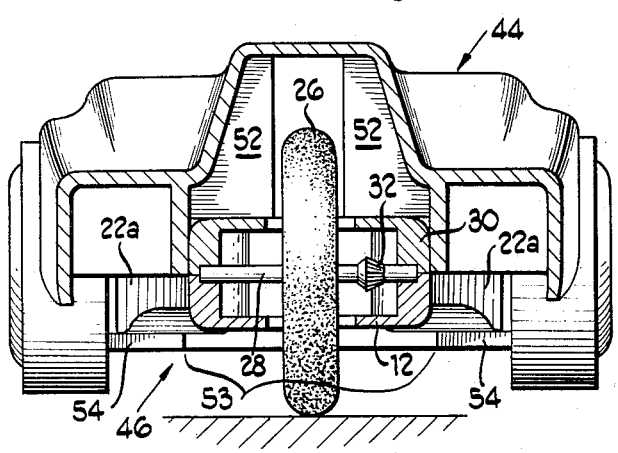

FIGURED TOY VEHICLE

FIELD OF THE INVENTION

This invention relates to toy wheeled vehicles and especially to such vehicles which comprise or have a human-form figure.

SUMMARY OF THE INVENTION

The present invention contemplates the utilization of a vehicle having a wheeled chassis with a human-form head member mounted at the forward end of the chassis. A plurality of interchangeable shells are provided which receive the chassis on the underside of the shells with the head member protruding through the top of the shells. Each shell defines a different form of vehicle such as a boat, airplane or automobile.

In one form of the invention the chassis is provided with human-form arm and leg members having hand and foot portions, respectively, on the ends thereof. The arms and legs are pivotally mounted on the chassis and are used not only to simulate movement of human arms and legs, but further to lock the chassis within each shell by positioning the arms and legs over blocking members to prevent the chassis from becoming dislodged from the shell.

The chassis also is useful in the absence of the shells as a wheeled toy. In this form the head can be pivoted from a normal rearward position overlying the front of the chassis to a position extending forwardly of the chassis. The feet elements are weighted to stabilize the vehicle.

While this invention is susceptible of embodiment in many different forms, there are shown in the drawings and will herein be described in detail various embodiments thereof, with the understanding that the present disclosure is to be considered as an exemplification of the principles of the invention and is not intended to limit the invention to the embodiments illustrated.

BRIEF DESCRIPTION OF THE DRAWINGS

FIG. 3 is a fragmentary top plan view of a combination of this invention including the wheeled figure positioned and releasably locked within a shell member simulating an automobile;

FIG. 4 is a vertical section taken generally along line 4—4 of FIG. 3; and

FIG. 5 is a vertical section taken generally along line 5—5 of FIG. 4.

DESCRIPTION OF THE PREFERRED EMBODIMENT

Figure 1:
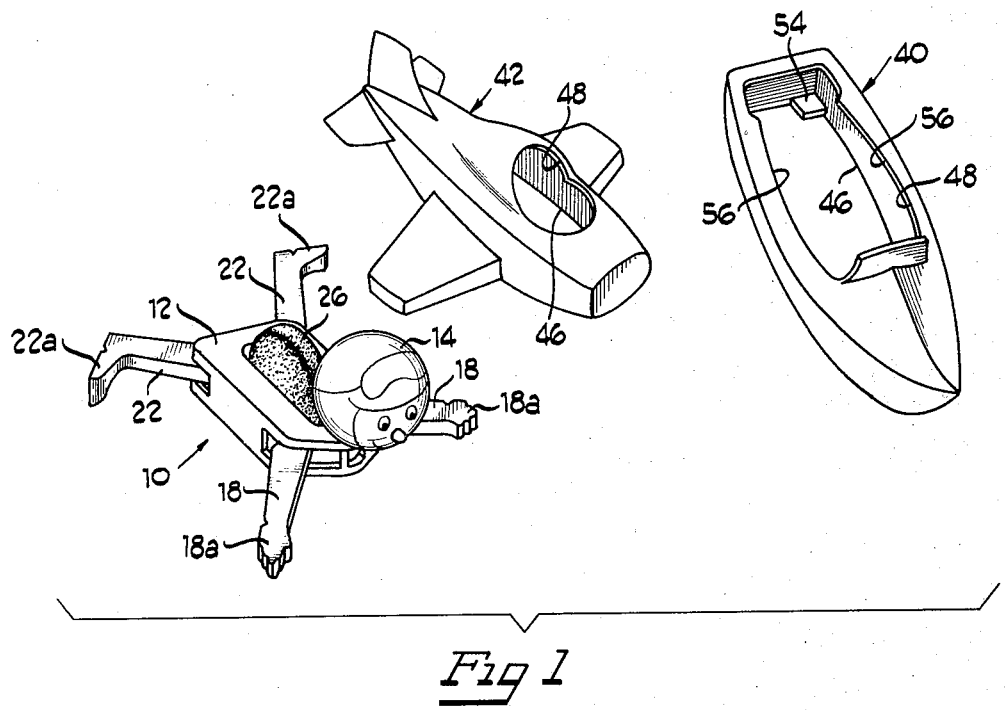
FIG. 1 is a perspective view of a wheeled figure and a plurality of vehicle-form shells as one embodiment of the invention.
Figure 2:
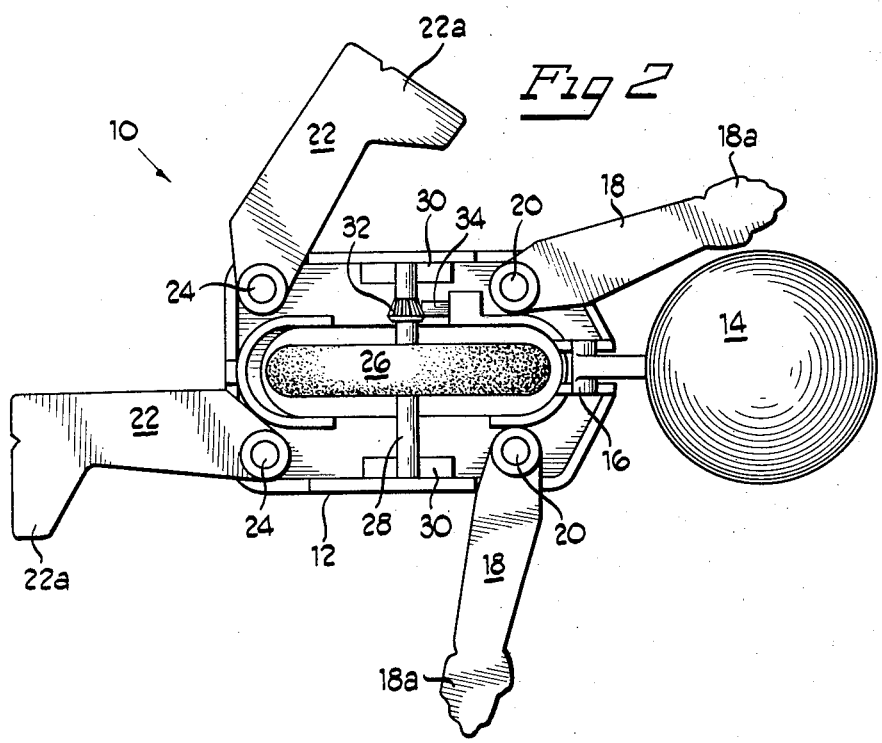
FIG. 2 is a plan view of the wheeled figure shown in FIG. 1 with the upper half of the chassis removed.

Referring first to FIGS. 1 and 2, there is shown a human-form wheeled figure, generally designated 10, having a chassis 12 and a head member 14 pivotally mounted by a pivot pin 16 at the forward end of chassis 12 for movement between a raised position, as seen in FIG. 1, partially overlying chassis 12, and a forwardly extended position, as seen in FIG. 2.

Each of two arm members 18 has a hand element 18a at the extremity thereof and is mounted by a pivot pin 20 for pivotal movement between a laterally outwardly extending position and a forwardly extending position, both seen in FIG. 2. Additionally, two leg members 22, having feet elements 22a, are mounted at the rear of chassis 12 on pivot pins 24 for pivotal movement between laterally outwardly extending positions and rearwardly extending positions, also as seen in FIG. 2.

Referring especially to FIGS. 2 and 5, a momentum motor means is provided for chassis 12 in the form of a fly-wheel 26 secured to an axle 28 which is journalled for free rotation in bearing blocks 30. As best seen in FIG. 2, chassis 12 is provided with a noise maker in the form of a bevelled gear 32 secured to axle 28 and a relatively stiff resilient flap member 34 biased against gear 32 so that as gear 32 rotates with axle 28, the end of flap member 34 snaps in and out of the gear teeth to produce an engine-like sound.

It should be appreciated that the human-form figure 10 is a useful toy and can be played with by a child. Accordingly, the child grasps the toy by chassis 12 and spins wheel 26, usually by engaging and stroking the wheel against a surface. Once the wheel is spinning the child can lay the human-form figure 10 on a surface and the momentum built up in wheel 26 will carry the figure 10 across a floor or other surface. The flywheel 26 constitutes a sufficiently heavy mass so that it can function as a momentum wheel to move the figure 10 a reasonable distance.

If the child desires to place head 14 in its forwardly extending position during play, legs 22 can be moved to their rearwardly extended position so that the weighted foot portions 22a will at least partially counterbalance the weight of head 14.

Much amusement can be derived by a child in playing with the device as thus far described. An important feature of the device is the combination of the wheel means 26 with the human-form figure 10 which serves as a basis for a child to create fantasies involving a motorized human being and stimulates the child's imagination as to what various acts could be performed with such a being.

Also provided for use in combination with the human-form figure 10 are a plurality of shell members in the form of a boat, generally designated 40 (FIG. 1), an airplane, generally designated 42, and an automobile, generally designated 44 (FIGS. 3–5). Each shell member has an open bottom 46 for receiving the wheeled human-form figure 10, and a top head receiving port 48 through which head 14 of the figure 10 projects when the figure is contained within a shell member.

More particularly and with special references to FIGS. 3–5, to insert figure 10 in position within a shell member (40, 42 or 44) the arm members 18 and the leg members 22 are extended to their forward and rearward positions respectively. Head member 14 is placed in its raised position and the figure 10 is inserted through the open bottom 46 so that the head member 14 protrudes through port 48 and the hand elements 18a rest on a ledge 50 provided in the forward portion of the shell. The chassis 12 is pressed upward until its top wall abuts the lower surface of stop members 52. The feet elements 22a have now passed through an opening 53 between a pair of rear lateral ledges 54 provided in the shell. Legs 22 are then pivoted slightly laterally outwardly until the feet elements 22a engage the top surfaces of ledges 54. The toy then becomes a simulated automobile (i.e., 44 in FIGS. 3–5) with the head 14 of the "driver" showing through the top thereof. The resultant combination can be played with in the same manner as the human-form figure 10 described above using the momentum of wheel 26 for moving the toy across a surface.

It will be apparent that the figure 10 can readily be removed from shell 44, for instance, and placed in either of shells 40 or 42. Shells 40 or 42 are provided with the same ledges 50 and 54. Shell 40 is provided with ledges 50 and 54 but uses top side decks 56 as top members.

The combination of the wheeled human-form figure 10 with various shell members 40, 42 and 44 is an important feature provided by one form of the present invention. It serves as a more expanded basis on which the child can create fantasies involving a human being as an integral part of a vehicle. The child can even imagine himself as being in the position of the figure 10 and actually being an airplane, boat or some other vehicle.

We claim:

1. A toy wheeled vehicle structure comprising, in combination: a wheeled chassis having human-form appendages movably mounted thereon, and a vehicle simulating shell having engaging surface means positioned for complementary engagement with at least some of said human-form appendages when the appendages are moved into predetermined locking positions to removably and releasably interlock the shell onto the chassis, whereby said chassis and its human-form appendages may be utilized alone as a simulated vehicle or in combination with the removably mounted simulated vehicle shells.

2. A toy wheeled vehicle structure comprising, in combination:
   a chassis having a wheel mounted on an axle rotatably mounted on the chassis and including a bevel gear on said axle and a resilient relatively stiff flap having a free end in engagement with said gear;
   a head member mounted on and extending from said chassis;
   shell means defining at least one vehicle form having a top wall, sidewalls and an open bottom wall for receiving at least a portion of said chassis;
   a port in said top wall for receiving said head member protruding therethrough from said chassis within said shell;
   means for releaseably locking said shell on said chassis; and
   whereby said flap snaps in and out of the teeth of said gear during rotation of said wheel to produce sound.

3. A toy wheeled vehicle structure comprising, in combination:
   a wheeled chassis;
   a head member mounted on and extending from said chassis, said head member being pivotally mounted on said chassis for movement between an erect position above portions of said chassis and an extended position generally in front of said chassis;
   shell means defining at least one vehicle form having a top wall, sidewalls and an open bottom wall for receiving at least a portion of said chassis;
   a port in said top wall for receiving said head member protruding therethrough from said chassis within said shell; and
   means for releaseably locking said shell in said chassis.

4. The structure of claim 3 including a pair of arms pivotally mounted on the front of said chassis for movement between laterally extended positions and forwardly extended positions, a pair of legs mounted on the rear of said chassis for movement between laterally extended positions and rearwardly extended positions, said leg members having weighted foot elements which in rearwardly extended position tend to stabilize the vehicle.

5. A toy wheeled vehicle structure comprising, in combination:
   a wheeled chassis;
   a head member mounted on and extending from said chassis;
   a pair of appendages pivotally mounted on the front of said chassis;
   a pair of appendages pivotally mounted on the rear of said chassis;
   shell means defining at least one vehicle form having a top wall, sidewalls and an open bottom wall for receiving at least a portion of said chassis;
   a port in said top wall for receiving said head member protruding therethrough from said chassis within said shell; and
   means for releaseably locking said shell on said chassis.

6. The structure of claim 5 wherein said head member is pivotally mounted on said chassis at the front thereof for movement between a raised position above portions of said chassis and a forwardly extended position generally in front of said chassis.

7. The structure of claim 6 wherein the locking means comprises a forward flange member within said shell means for receiving and supporting said arm members and a pair of lateral rear flange members within said chassis, one adjacent each sidewall thereof, with a space therebetween permitting said leg members to pass through the space with said leg members pivoted together, the rear flanges receiving and supporting the leg members with the legs pivoted apart whereby said chassis is releasably supported within said shell means.

8. The structure of claim 7 including stop means within said shell means for abutting the top wall of said chassis to hold said chassis with said feet and hand elements in engagement with said flanges.

9. A combination figure toy and vehicle, comprising:
   an articulated figure including a torso portion having an opening therethrough;
   a wheel rotatably mounted on said torso and extending outwardly through said opening; and
   a vehicle body portion removably attached to said figure so that said wheel on the figure provides a rolling support for the vehicle.

10. The combination figure toy and vehicle of claim 9 wherein said vehicle body includes an opening for receiving the head of said figure in an upwardly protruding relation thereto.

11. The combination figure toy and vehicle of claim 9 wherein a noise maker is carried by said figure for operation in response to rotation of said wheel.

12. The combination figure toy and vehicle of claim 9 wherein said figure includes legs and a head each movably connected to said torso portion.

13. The combination figure toy and vehicle of claim 12 including means on said vehicle body which is cooperable with said legs of said figure to removably attach the vehicle body to the figure.

* * * * *